United States Patent [19]

Niimura

[11] Patent Number: 5,294,211

[45] Date of Patent: Mar. 15, 1994

[54] FLOATING WAVE ABSORBER

[76] Inventor: Masateru Niimura, Tokyo, Japan

[21] Appl. No.: 910,869

[22] Filed: Jul. 7, 1992

[30] Foreign Application Priority Data

| Jul. 8, 1991 | [JP] | Japan | 3-263369 |
| Jul. 31, 1991 | [JP] | Japan | 3-088182[U] |
| Aug. 8, 1991 | [JP] | Japan | 3-093810[U] |
| Mar. 19, 1992 | [JP] | Japan | 4-112041 |

[51] Int. Cl.$^5$ ............................................. E02B 3/06
[52] U.S. Cl. ........................................ 405/27; 405/28; 405/26
[58] Field of Search ............... 405/21, 23, 26, 27, 405/28, 22, 24, 25

[56] References Cited

U.S. PATENT DOCUMENTS

| 436,644 | 9/1890 | White | 405/27 |
| 3,276,210 | 10/1966 | Stitt | 405/27 |
| 3,791,150 | 2/1974 | Tachii | 405/27 |
| 4,776,724 | 10/1988 | Isozaki | 405/27 |

FOREIGN PATENT DOCUMENTS

| 56-70310 | 6/1981 | Japan | 405/26 |
| 58-117112 | 7/1983 | Japan | 405/27 |

Primary Examiner—Dennis L. Taylor
Assistant Examiner—Arlen L. Olsen
Attorney, Agent, or Firm—Armstrong, Westerman, Hattori, McLeland & Naughton

[57] ABSTRACT

A floating wave absorber is composed of a main wave-absorber body formed by a construction body floating on the surface of water, wires of which each one end is connected to an end portion of the main wave-absorber body, a first traction member of which one end is connected to the other bound end portion of each wire and the other end is fixed to an anchor, and a second traction member of which one end is connected to the bottom of the main wave-absorber body and fixed to another anchor. The main wave-absorber body is floated on the water according to a so-called "kite flying" principle and absorbs waves. Thus, the wave absorber is more advantageous in economic performance and free from washing-away by abnormally high waves in a typhoon, etc., and can be installed quickly and absorb waves effectively.

5 Claims, 15 Drawing Sheets

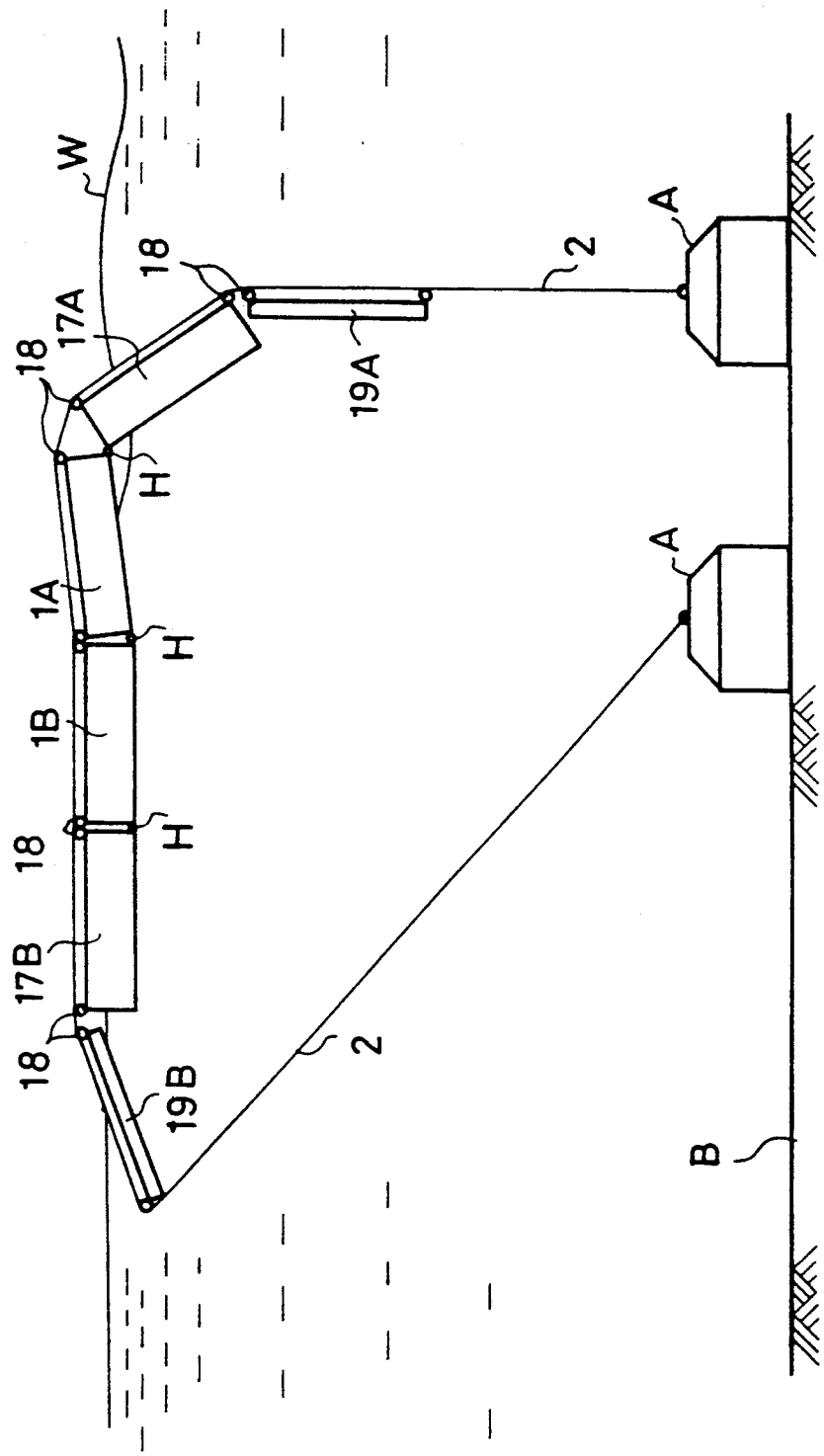

FLOATING WAVE ABSORBER

FIELD OF THE INVENTION

The present invention relates to a floating wave absorber that floats on the water and effectively attenuates waves and more particularly, a floating wave absorber that can effectively absorb waves according to the conditions of waves such as velocities and heights.

BACKGROUND OF THE INVENTION

Means known in the prior art to attenuate or absorb waves include fixed type breakwaters and mounting types wave absorbing blocks. When the former fixed type breakwater is constructed, a large rubble-mound, etc. is installed at the bottom of the water, on which a concrete breakwater has to be constructed. Therefore, a tremendous amount of materials is needed while the progress of the construction work greatly depends on weather conditions. Hence, there is a problem that much cost and time are spent.

To the contrary, a mounting type wave absorber block is prefabricated somewhere else without being affected by weather, etc., and then mounted in the water. Therefore, said type is more advantageous than the fixed type breakwater in terms of cost and time.

However, even with said conventional mounting type wave absorber blocks, it has to be estimated according to predicted conditions of waves how many wave absorber blocks are to be installed in a predetermined region. Consequently, it often occurs that an excess number of wave absorber blocks is counted. Furthermore, if the blocks encounter abnormally high waves due to a typhoon in a repeated manner, the wave absorber blocks are sometimes lost because of washing-away demanding to supplement the blocks. Hence, also with the mounting type the wave absorber blocks, there is a problem that maintenance cost as well as mounting cost are high.

OBJECTS OF THE INVENTION

The present invention has been accomplished in these circumstances as described above. An object of the present invention is to offer such a floating wave absorber apparatus that is advantageous in economic performance, extremely easily and quickly installed, free from risks of washing-away by abnormally high waves of a typhoon, and can effectively absorb waves in a simple structural composition.

SUMMARY OF THE INVENTION

In order to achieve the above-mentioned object, a floating wave absorber according to the present invention consists of a main wave-absorber body formed by a construction body floating on the surface of water, wires of which each one end is connected to an end portion of the main wave-absorber body, a first traction member of which one end is connected to the other bound end portion of each wire and the other end is fixed to an anchor, and a second traction member of which one end is connected to the bottom of the main wave-absorber body and fixed to another anchor.

In addition, according to the present invention, another means for achieving more effective wave absorbing is composed of a floating wave absorber consisting of a main wave-absorber body formed by a construction body floating on the surface of water, wires of which each one end is connected to an end portion of the main wave-absorber, a first traction member of which one end is connected to the other bound end portion of each wire and the other end is fixed to a first anchor, a second traction member of which one end is connected to the bottom of the main wave-absorber body and fixed to a second anchor, and a third traction member of which one end is connected to the top of the main wave-absorber body and the other end is fixed to a third anchor.

Furthermore, there are still other means according to the present invention in order to accomplish more effective wave absorbing, including a floating wave absorber consisting of a construction body floating on the surface of water, two or more pieces of main-wave absorber bodies of which the opposed end portions are connected rotatably, and a traction member of which one end is connected to a free end portion of each connected main wave-absorber body and the other end is connected to an anchor installed at the bottom of water, wherein;

the connected main wave-absorber bodies are installed floatedly on the surface of water in a substantially inverted-V shape.

Moreover, according to the present invention, still other means to realize more effective wave-absorbing include a floating wave absorber consisting of a construction body floating on the surface of water, two or more pieces of main-wave absorber bodies of which the opposed end portions are connected rotatably, and a traction member of which one end is connected to a free end portion of each connected main wave-absorber body and the other end is connected to an anchor installed at the bottom of water, wherein;

the connected main wave-absorber bodies are installed floatedly on the surface of water in a substantially inverted-V shape, and a supporting body formed in a triangular-column shape is intercalatedly installed inside the top portion of the main wave-absorber body installed in an inverted-V shape.

Moreover, according to the present invention, it is possible to compose a floating wave-absorber for more effective wave absorbing by intercalating a reflected-convection-preventive plate between each main wave-absorber body and the end portion of the traction member connected to the free end portion of each main wave-absorber body.

Furthermore according to the present invention, it is also possible to compose the main wave-absorber body for a lower cost and a more effective flotation force by mounting a flotation body formed by a synthetic resin pipe on the main absorber body.

Therefore, with the floating wave absorber according to the present invention, the main wave-absorber body floats on the surface of water according to the principle of so-called "kite flying" and absorbs waves. Consequently, more effective wave absorbing according to various wave conditions such as heights and velocities is enabled. In addition, when abnormally high waves come because of a typhoon, etc., the main wave-absorber body is submerged by making constant the length of the second traction member connected at the bottom of the main wave-absorber body, thereby avoiding the affect of the high waves while protecting the main wave-absorber body from fracture.

BRIEF DESCRIPTION OF THE DRAWINGS

FIG. 16 is a side explanatory view illustrating the operation state of the floating wave absorber.

PREFERRED EMBODIMENTS

FIGS. 1 through 9 show a floating wave absorber related to a first embodiment according to the present invention. The floating wave absorber related to this embodiment consists of a main wave-absorber body 1 floating on the surface of water in a substantially upright manner, wires of which the ends are connected to the top and bottom ends of the main wave-absorber body 1, a first traction member 3 of which one end is connected to the other bound end portion of each wire 2 and the other end is fixed to an anchor A installed on the water bottom B, and a second traction member 4 of which one end is connected to the bottom of the main wave-absorber body 1 and the other end is fixed to an anchor A in the water bottom B.

Figure 2:
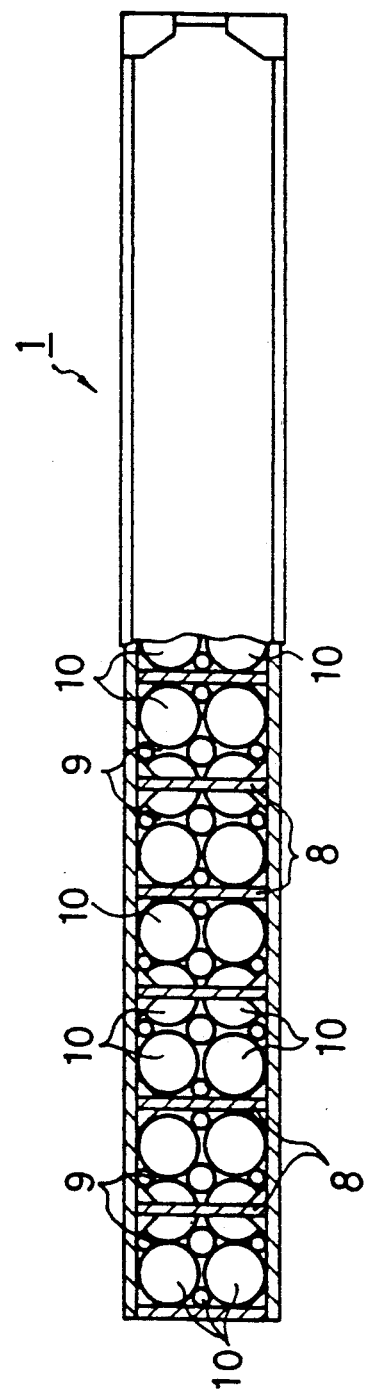
FIG. 2 is a vertical section view for the main wave-absorber body of the floating wave absorber.

The main wave-absorber body 1 is composed of a material or a construction that can float on the water surface W and, as shown in FIG. 2, it is formed in a hollow-box structure using a material excellent in water-proofing or treated for water-proofing.

Inside the main wave-absorber body 1 thus formed in a hollow-box structure, there is a plurality of chambers 9 formed by intermediate partition plates 8. In each chamber 9, synthetic resin pipes 10 in different aperture diameters are mounted as a buoyancy body.

The synthetic resin pipes 10 in use are composed of, for example, a low-cost synthetic resin material formed into pipes, such as PVC pipes. Because the specific gravity of the synthetic resin material itself is small enough for flotation on the water, the main wave-absorber body 1 is given a satisfactory buoyancy. In addition, since the resin is formed into pipes, a large volume of air is sealed inside the chambers 9. Consequently, it is possible to give the main wave-absorber body 1 a larger buoyancy. Furthermore, because the floating body is composed of the synthetic resin pipes 10, it is highly resistive to corrosion by entering water. In addition, work to replace the body can be performed easily.

Figure 3:
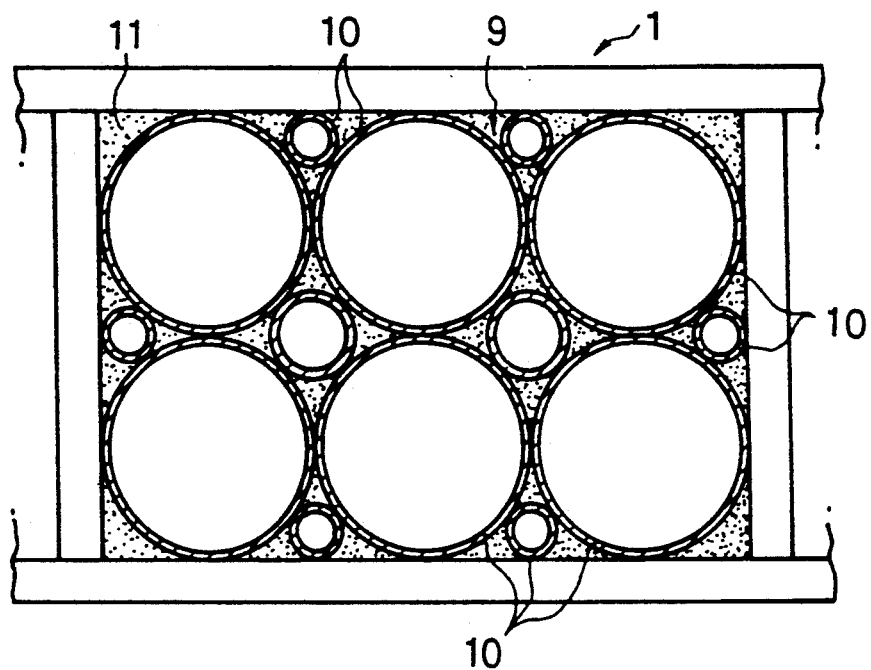
FIG. 3 is a section view expandedly showing a state where a synthetic resin pipe is filled in a chamber partitioned in the floating wave absorber.

It is of course possible to mount a foamed resin material 11 in the chambers 9 as shown in FIG. 3 so that air gaps created by mounting the synthetic resin pipes 10 are filled up while providing the main wave-absorber body 1 with a still larger buoyancy.

Figure 4:
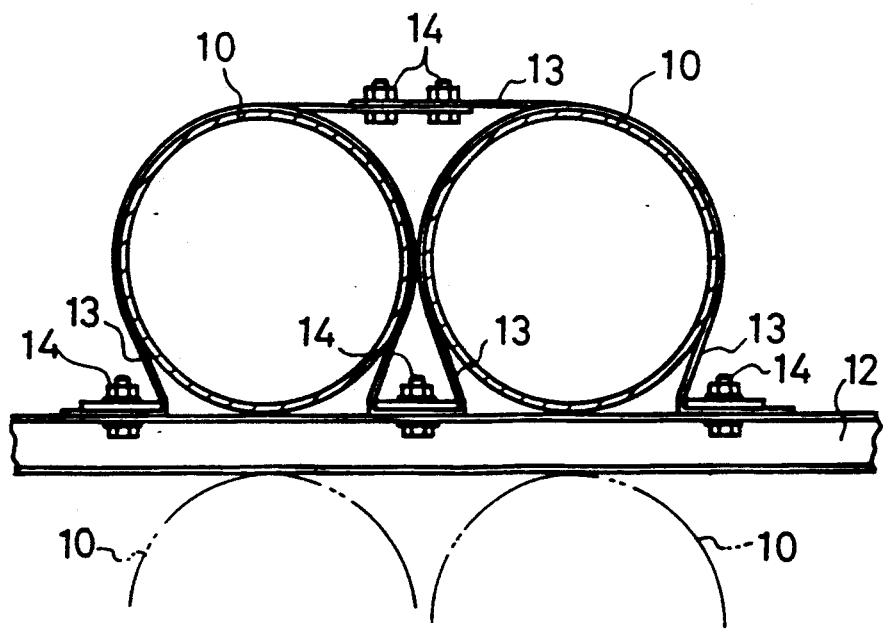
FIG. 4 is a partial enlarged view indicating the state of a supporting float.

In order to further increase buoyancy given to the main wave-absorber body 1 composed as described above, a supporting float can also be mounted as shown in FIG. 4.

The supporting float consists of the synthetic resin pipes 10 wound with a belt 13 and wrapped fixed on a frame body portion 12 of the main wave-absorber body 1 composed of H-shaped steel.

More explicitly, the belt 13 for fixing the supporting float, that is, the synthetic resin pipes 10 on an upper part or upper and lower parts of the frame body portion 12 is in close contact in an intermediate portion thereof with the outer periphery of the synthetic resin pipes 10, while both ends thereof are fixed onto the frame body portion 12 via bolts and nuts 14. Hence, the supporting float namely the synthetic resin pipes 10 are mounted so that they will not easily come off the frame body portion 12.

Thanks to such a mounting means as described above, it is easy to provide the main wave-absorber body 1 with a satisfactory buoyancy even when the buoyancy by the synthetic resin pipes 10 mounted inside the body 1 is insufficient. In addition, work for removing or mounting the synthetic resin pipes 10 becomes extremely easy. These effects are advantageous.

On the other hand, the wires 2 of which the ends are connected to the top and bottom ends of the main wave-absorber body 1 can also be diverted from wires composed like conventional wires. More preferably, however, the wires in use are treated appropriately for water-proofing.

Furthermore, a first traction member 3 is connected to the other ends of the wires 2. The construction of the connection portion thereof comprises a so-called "half hitch" in the illustrated embodiment. The member can also be connected of course by disposing pulleys, etc. at the connection portion.

Figure 5:
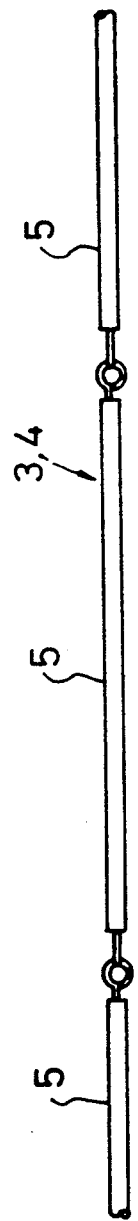
FIG. 5 is a partial plan view for denoting an example of a traction member of the floating wave absorber.

The first traction member 3 and the second traction member 4 of which one end is connected to the bottom end of the main wave-absorber body 1 in use are shown in FIG. 5 where sealed pipe bodies 5 in suitable lengths are connected so that the bodies can bend.

Figure 6:
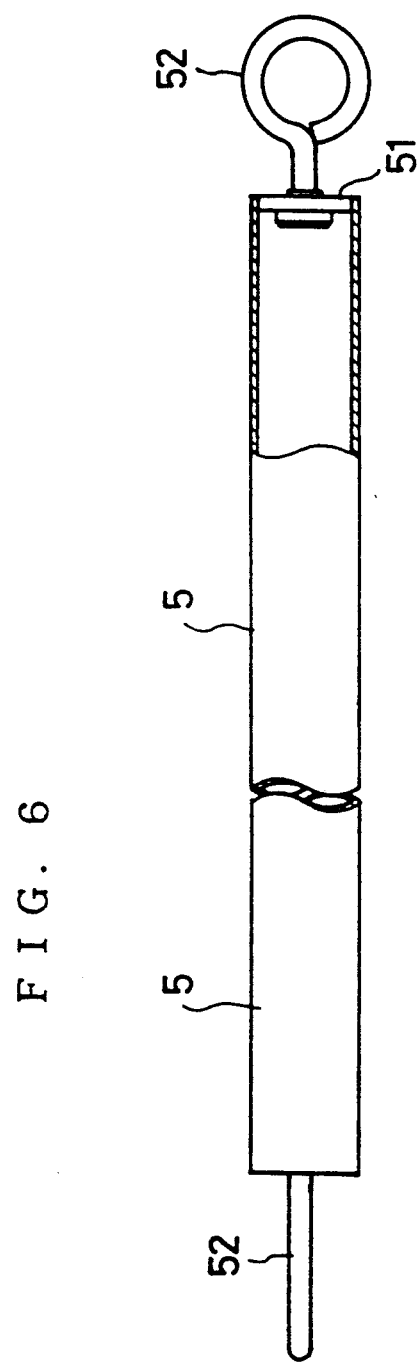
FIG. 6 is an enlarged partial plan view depicting said traction member partially cut away.

The sealed pipe bodies 5 are shown in FIG. 6 where a cap 51 is mounted at both ends of each pipe and welded thereto to clog the pipe the interior of which is hermetically sealed. In addition, a connection ring 52 is fixed onto the cap 51.

Figure 7:
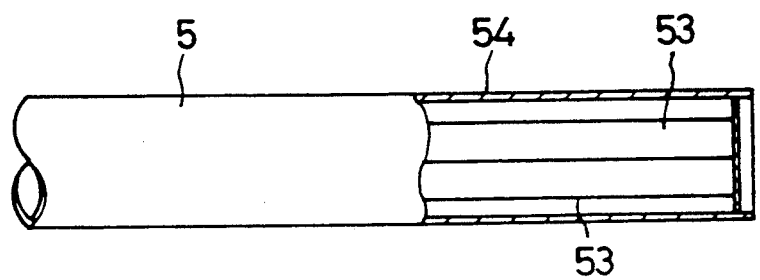
FIG. 7 is an enlarged partial plan view for denoting another embodiment of the traction member partially cut away.

In addition, the sealed pipe bodies 5 are composed of a high-tension material with an epoxy base adhesive 54 coated on the inner surface thereof. Furthermore, as shown in FIG. 7, a plurality of high-tension members 53 is encased.

The high-tension members 53 are composed of, for instance, wire ropes, piano wires, alamide fibers, carbon fibers or other high-tension metal wires or various synthetic resin base fibers.

Figure 8:
FIG. 8 is a partial plan view showing still another embodiment of the traction member after partially cutting away.

Moreover, the high-tension members 53 are coated or impregnated with, for example, an epoxy base adhesive 54 to integrate the high-tension members 53 altogether. At that time, the high-tension members 53 are also integrated with each sealed pipe body 5. In order to make larger the tensile strength of the traction members 3 and 4, it is of course possible to bundle a suitable number of the sealed pipe bodies 5 into a bundle body 5 as shown in FIG. 8. It is also possible in this case to encase the bundle body 6 further into a sealed pipe body 5A as shown by the imaginary line of FIG. 8.

Therefore, with these traction members 3 and 4, the members 3 and 4 themselves are provided with a buoyancy. Since they are also formed long, handling thereof is much easier. Compared to a conventional traction member, that is, a chain, production cost of the traction members 3 and 4 can be greatly reduced. In addition, the strength thereof can also be improved significantly. Moreover, the functions of the main wave-absorber body 1 can be advantageously improved without deterioration of a buoyancy of the main wave-absorber body 1. As a matter of course, it is also possible to substitute the traction members in the composition as described above according to the present invention with a conventional traction member such as a chain.

Next, the operation of the floating wave absorber according to the embodiment described above is explained in the following.

First, in order to mount the main wave-absorber body 1 on predetermined water surface W, an anchor A is fixed at a water bottom B in the upstream side in relation to a water-flow direction "a" in a water region where the main water-absorber body 1 is to be set. Then, the other end of the first traction member 3 is connected to the anchor A.

The other end of the second traction member 4 is also connected to another anchor A fixed on a water bottom B substantially beneath the main water-absorber body 1 after setting.

In the above, the first and second traction members 3 and 4 are fastened with a high tide level out of predicted tide levels in a water region where the main wave-absorber body 1 is set.

Thus, the main water-absorber body 1 receives a wave force coming from a water flow direction "a" while forcefully and always conducting waves into water. Therefore, waves appearing on the surface of water in the downstream side of the main wave-absorber body 1 greatly attenuate while effectively creating calm surface of water in the downstream side of the main wave-absorber body 1.

The main wave-absorber body 1 stands substantially upright and absorbs waves at the high tide level. At a low tide level, it absorbs waves in a slightly inclined state as shown in the imaginary line of FIG. 1, where effective wave absorbing is activated according to water levels, wave heights and velocities and other wavy conditions.

Figure 9:
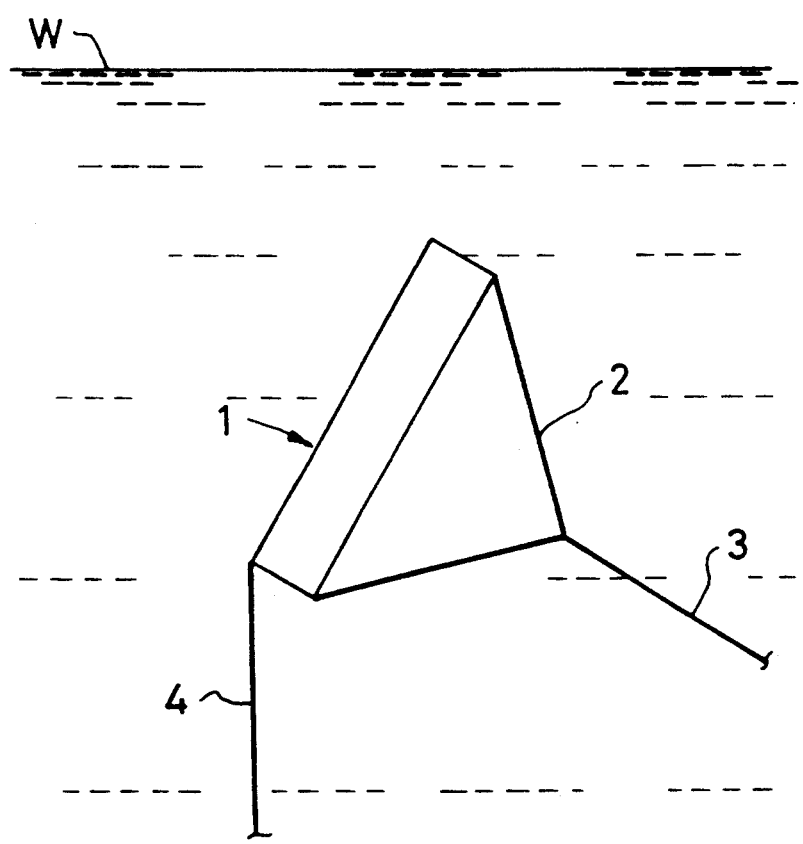
FIG. 9 is a side view showing the state in which said floating wave absorber is submerged.

When abnormally high waves attack because of a typhoon, etc., the floating wave absorber not only can no longer absorb waves but also might be damaged in the extreme. Even at that time, since the length of the second traction member 4 is preset at a certain value, the main wave-absorber body 1 submerges as shown in FIG. 9, thereby avoiding an adverse affect of winds and waves.

Figure 1:
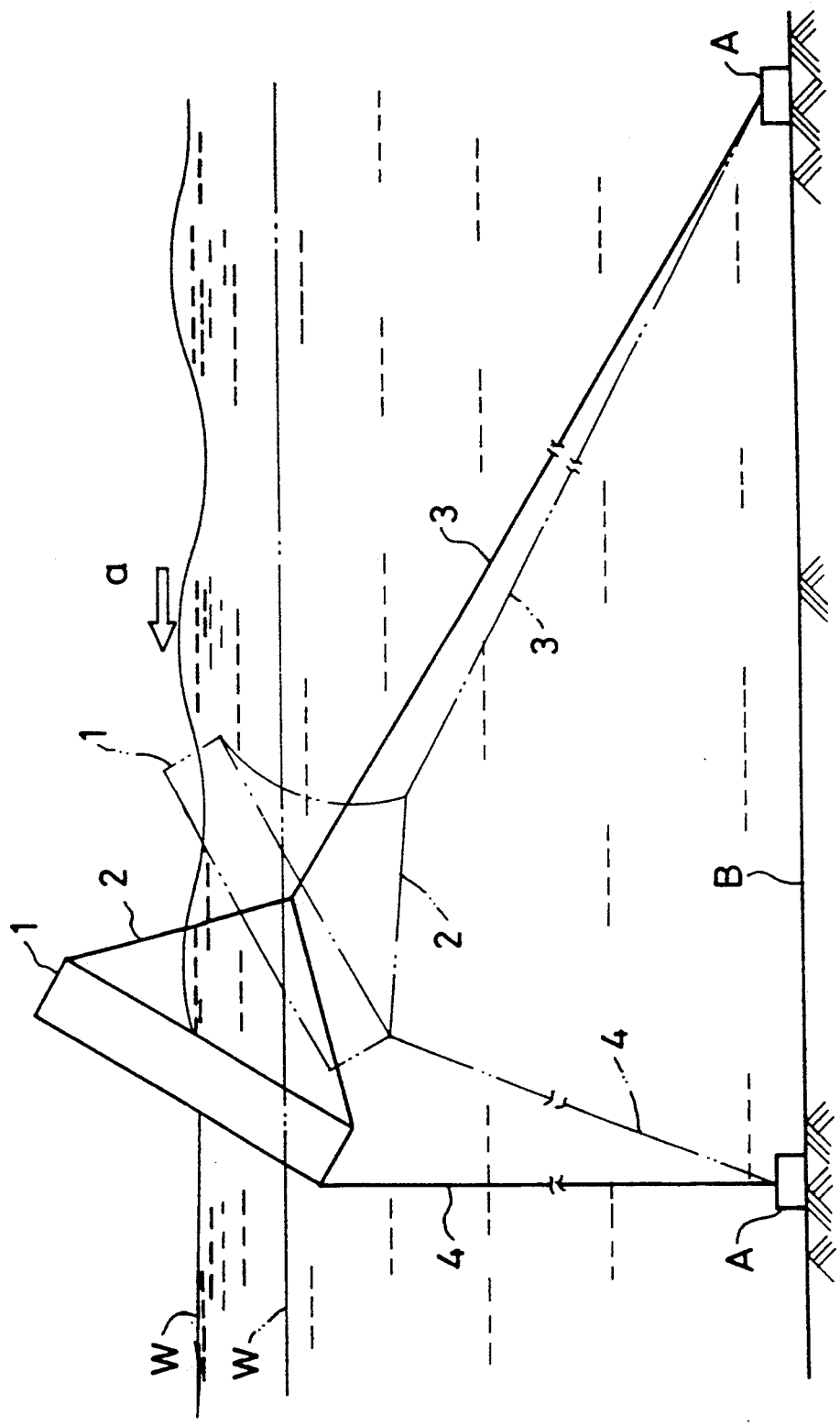
FIG. 1 is a side view showing the state of a floating wave absorber of a first embodiment according to the present invention, floating on the surface of water, together with an operation state thereof.

When the main wave-absorber body 1 tilts in a low tide level as shown by the imaginary line of FIG. 1, the lower half portion of the wire 2 connecting the upper and lower ends of the main wave-absorber body 1 is tightened with the upper half portion thereof slackened. This slackening of the wire can be eliminated by disposing pulleys, etc. at the other and portion of the wire 2, thus maintaining the entire wire 2 always in a tensioned state.

Figure 10:
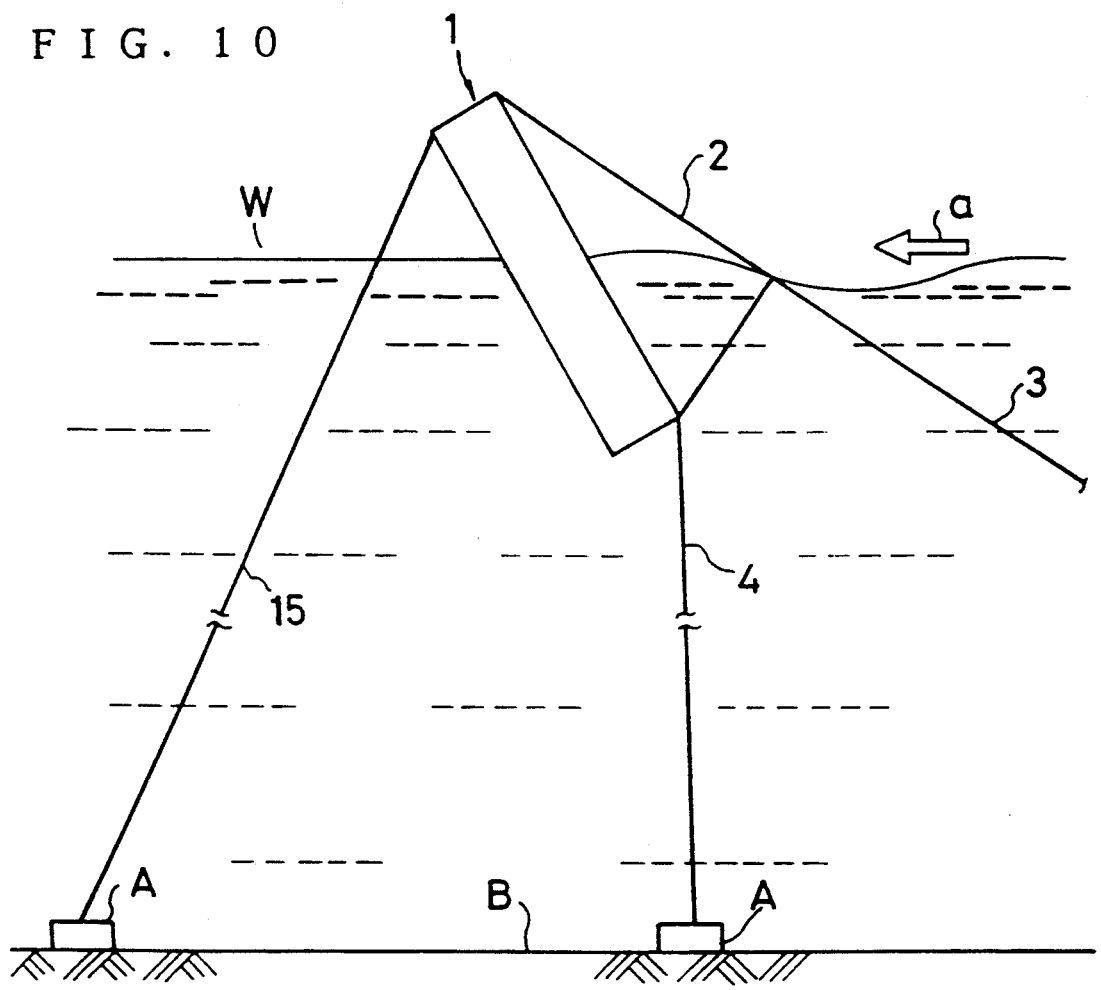
FIG. 10 is a side view illustrating the state where the floating wave absorber related to a second embodiment of the present invention floats on the surface of water.

FIG. 10 depicts a floating wave absorber related to a second embodiment according to the present invention. With the floating wave absorber related to the present embodiment, the main wave-absorber body 1 is set in such a manner that it is tilted beforehand in the same direction as the water-flow direction "a" apart from the case of the first embodiment.

More explicitly with the main wave-absorber body 1 related to the second embodiment, one end of a third traction member 15 is connected to the top end of the main wave-absorber body 1 in addition to the composition of the floating wave absorber related to the first embodiment. In addition, the other end of the third traction member 15 is connected to an anchor A fixed at a water bottom B in the downstream side of a water region where the main wave-absorber body 1 is set.

Thus, the main wave-absorber body 1 receives a wave force in the water-flow direction "a" and diverts part of the wave force forcefully into deep water while allowing the other part of the wave force to make waves override the top portion of the main wave-absorber body 1, according to the installation conditions of the body 1. Consequently, the main wave-absorber body 1 can more effectively attenuate wave forces propagated from the body 1 toward the surface of water in the downstream side.

Figure 11:
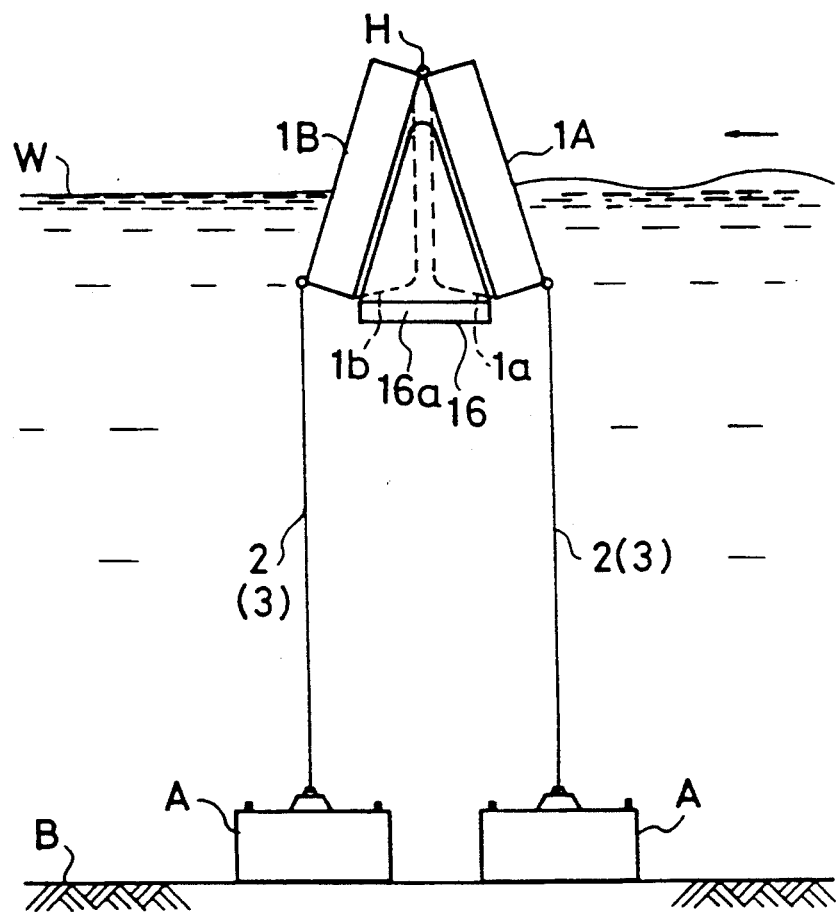
FIG. 11 is a side explanatory view indicating the state of the floating wave absorber related to a third embodiment of the present invention, in flotation on the surface of water.

FIG. 11 illustrates a floating wave absorber related to a third embodiment of the present invention. The floating wave absorber related to the present embodiment is composed of a connection construction body floating in a substantially inverted-V shape on the water surface W. In addition, a pair of main wave-absorber bodies 1A and 1B of which the opposed end portions are connected with each other rotatably by a hinge H is provided. Furthermore, there are provided traction members 2 and 2 of which each one end is connected to the free side end portion of each main wave-absorber body 1A or 1B and the other end portions are connected to anchors A installed on the water bottom B. Another composition element of the third embodiment is a supporting body 16 disposed inside the pair of main wave-absorber bodies 1A and 1B.

As described above, the main wave-absorber bodies 1A and 1B are connected rotatably with the hinge H at the opposed end portions thereof. In addition, at each free end portion of the main wave-absorber bodies 1A and 1B, one end of the traction member 2 or 2 of which the other end is connected to the anchor A is connected. Thus, the main wave-absorber bodies 1A and 1B are floated on the water surface W in an upright manner in a substantially inverted-V shape. Thereby, the traction members 2 and 2 can be extended substantially vertical. As a result, it becomes possible to install the equipment so that the installation width between the anchors A is maintained as narrow as about that of a fixed type breakwater. With the present embodiment, it is also possible to use the traction members 3 and 3 used in the first embodiment, in place of the traction members 2 and 2.

The supporting body 16 is used as a supplementary member when a buoyancy of the main wave-absorber bodies 1A and 1B is insufficient. It is formed substantially in a triangular column and constructed with a material or a construction floatable on the water, like the main wave-absorber bodies 1A and 1B. It is composed so that it does not turn over at the water surface W, by forming a weight portion 16a at the lower end portion thereof.

Consequently, where the buoyancy of the main wave-absorber bodies 1A and 1B is satisfactorily large, the supporting body 16 need not be used. However, the supporting body 16 also has a function to maintain the main wave-absorber bodies 1A and 1B in an inverted-V shape. Therefore, it is more preferable that the supporting body is mounted beforehand between the main wave-absorber bodies 1A and 1B.

Also, where the supporting body 16 is intercalated inside the main wave-absorber bodies 1A and 1B, it is possible to connect both side-end portions of the main wave-absorber bodies 1A and 1B using stopper pieces 1a and 1b as shown by the broken lines in FIG. 11. It is also possible to replace the stopper pieces 1a and 1b with, though not illustrated, a wire rope, etc. to connect the supporting body 16 to the main wave-absorber bodies 1A and 1B. Or, it is also practical to connect the top portion of the supporting body 16 to the hinge H.

Figure 12:
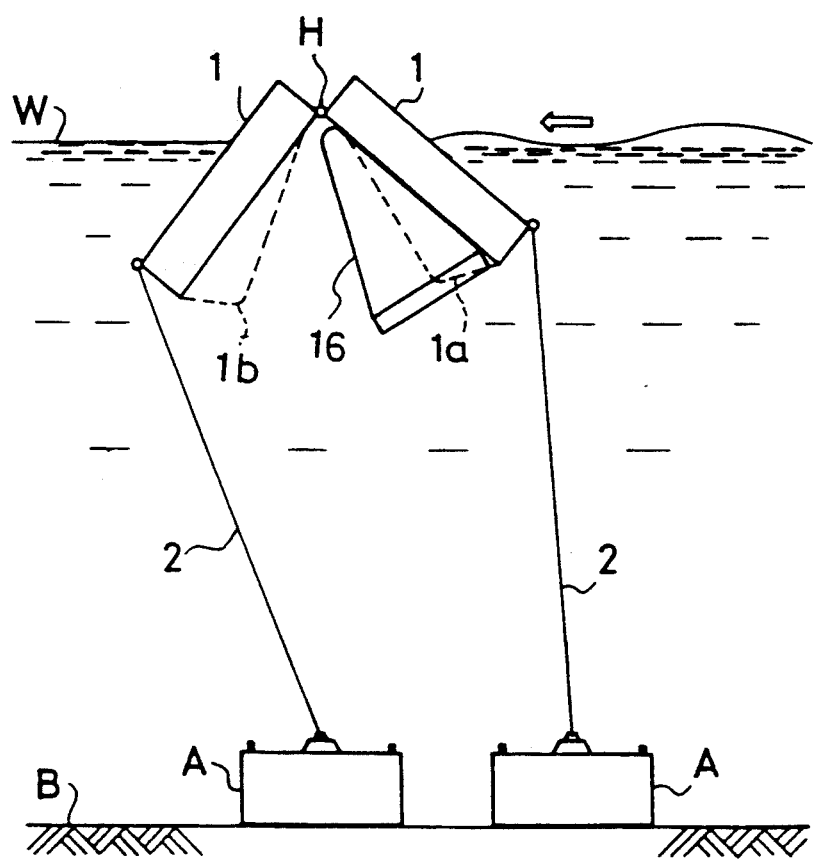
FIG. 12 is a side explanatory view depicting an operation state of the floating wave absorber.

Referring to FIG. 12, thus composed main wave-absorber bodies 1A and 1B receive impact of waves. At that time, the bodies 1A and 1B tilt toward downstream direction by the impact of the waves and absorb the waves. Upon the instant, the supporting body 16 comes in close contact with the inside of one main wave-absorber body 1A as shown in FIG. 12 while preventing the main wave-absorber bodies 1 from submerging into water. The supporting body 16 also functions so that the main wave-absorber bodies 1A and 1B can recover an original upright state of an inverted-V shape as shown in FIG. 11, as soon as possible.

Figure 13:
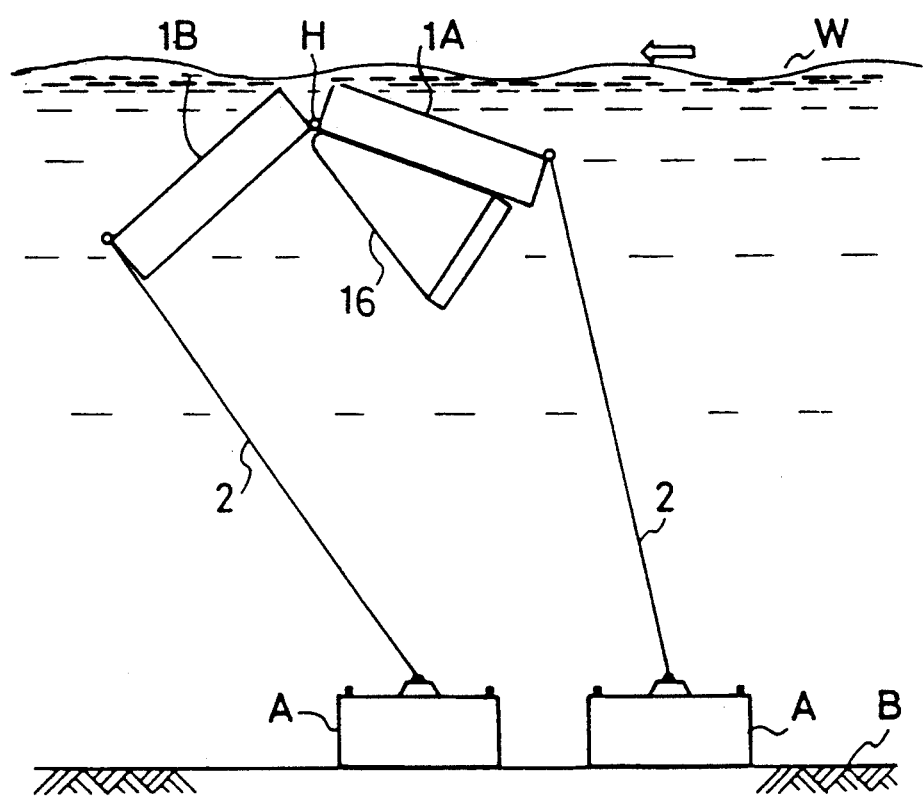
FIG. 13 is a side explanatory view showing another operation state of the floating wave absorber.

FIG. 13 depicts the operation of the floating wave absorber related to the present embodiment in which, even when waves become abnormally high owing to a typhoon, etc. so that the floating wave absorber not only can no longer satisfactorily absorb the waves but also may be broken in the extreme, the main wave-absorber bodies 1A and 1B can submerge to avoid an adverse affect from winds and waves since the length of each traction member 2 is preset at a predetermined value. It is also possible to submerge the absorber by winding or rewinding adequately each traction member 2 by remotely activating a revolving motor (not illustrated).

Figure 14:
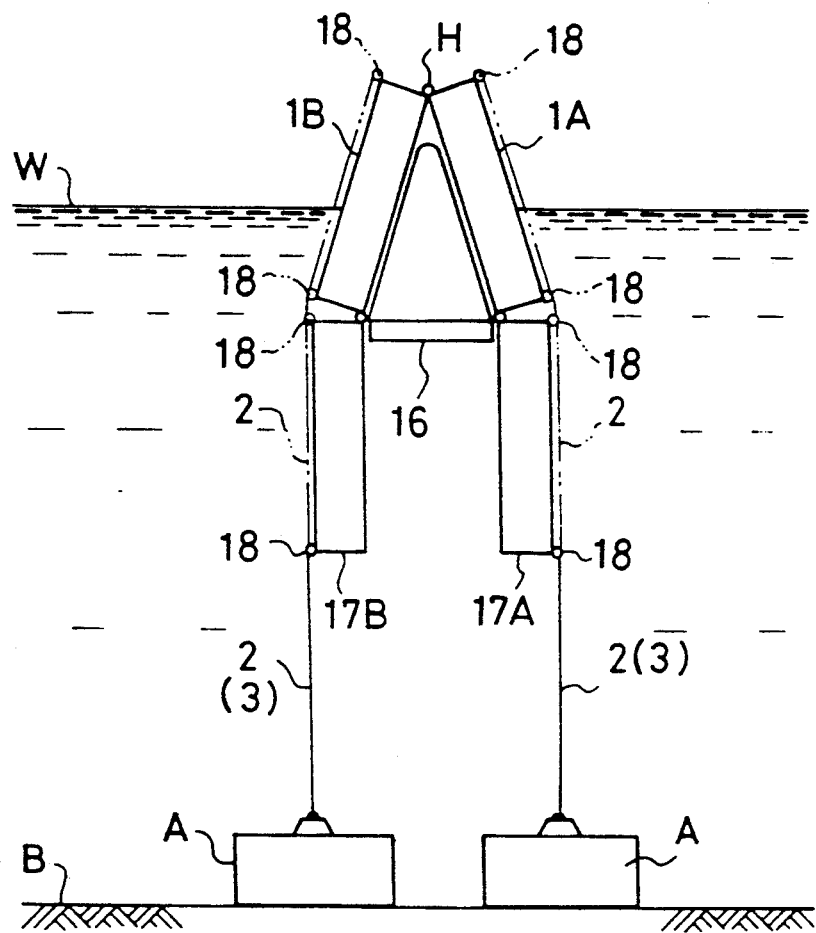
FIG. 14 is a side explanatory view illustrating the floating wave absorber related to a fourth embodiment of the present invention, in flotation on the surface of water.

FIG. 14 illustrates a fourth embodiment of the present invention, in which four pieces of the main wave-absorber bodies 1A, 1B, 17A and 17B are connected to compose a floating wave absorber thereby improving the effect of absorbing waves.

More explicitly according to the floating wave absorber related to the fourth embodiment, the opposed end portions of the four main wave-absorber bodies 1A, 1B, 17A and 17B are connected with the hinge H. In addition, each one end portion of the traction members 2 and 2 is slideably engaged with rollers 18 disposed on one side surface of each main wave-absorber body 1A, 1B, 17A or 17B. In addition, each other end portion of the traction members 2 and 2 is connected to each anchor A installed on the water bottom B.

Hence, according to the present embodiment, the main wave-absorber bodies 1A, 1B, 17A and 17B are connected with each other by hanging one end portion of each traction member 2 or 2 onto the rollers 18 disposed at upper and lower one-side end portions in the outside of the main wave-absorber bodies 1A, 1B, 17A and 17B. Thus, absorbing of waves can be effectively activated in a wide range from the water surface W to under the water.

In the fourth embodiment, the description relates to an example where the main wave-absorber bodies 1A, 1B, 17A and 17B are installed upright in an inverted-V shape by means of the hinge H. However, the present invention is not restricted only to this state but can be composed by connecting first three or more main wave-absorber bodies and then coupling them together with a hinge H.

Figure 15:
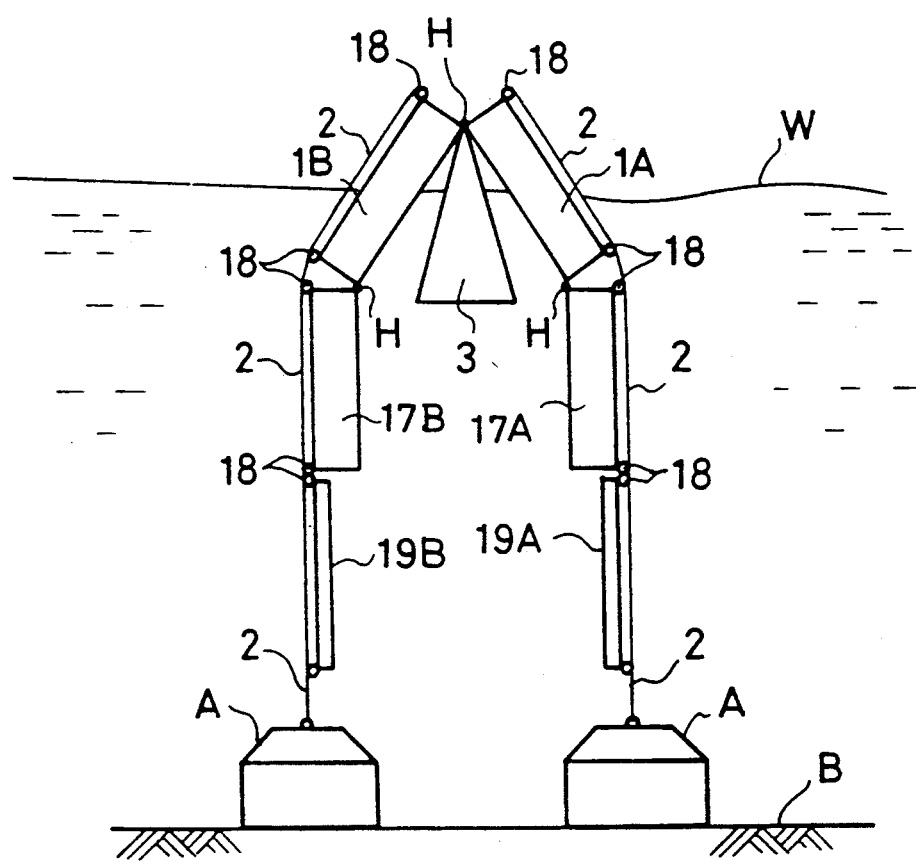
FIG. 15 is a side explanatory view denoting the floating wave absorber related to a fifth embodiment of the present invention, in flotation on the surface of water.

FIGS. 15 and 16 illustrates a fifth embodiment of the present invention, in which reflected-convection-preventive plates 19 and 19 are connected to the main wave-absorber bodies 1A, 1B, 17A and 17B composed according to the fourth embodiment, via a hinge H. In addition, one end of each traction member 2 or 2 is connected to each reflected-convection-preventive plate 19A or 19B. Thus, absorbing waves can be performed in a broader range. In addition, where an installation location of the equipment is, for instance, a shoal or other shallow part, waves reflected from the water bottom, caused by absorbing waves, are attenuated at the reflected-convection-preventive plates 19 and 19, thereby improving a wave-absorbing effect. Except for the above, the composition and operation of the fifth embodiment are the same as those of the fourth embodiment. Therefore, the numerals used in FIGS. 15 and 16 are the same as those of the fourth embodiment, while omitting detailed description for the symbols in here.

EFFECT OF THE INVENTION

According to the present invention as described above, the main wave-absorber body is maintained to float always on the surface of water using a wave force. Therefore, more effective absorbing of waves can be performed. In addition, the effect of absorbing waves is adequately and quickly controlled according to heights of water levels and sizes and velocities of waves. In addition, even when waves are abnormally high because of a typhoon, etc., adverse affect of waves can be eliminated automatically by submerging the main wave-absorber body. To the contrary, conventional fixed type breakwaters or mounting type wave-absorber blocks often bring environmental change or pollution because water flow is blocked between the water surface and the anchor or water-flow characteristics in the surroundings may alter. However, according to the present invention, no such adverse affects as described above are caused. In addition, installation work can be performed very easily and completed within a short time. Furthermore, installation cost can be greatly reduced.

Also according to the present invention, it is possible to make smaller the installation width of the anchors that trail the main wave-absorber body, in the same way as with a fixed type breakwater. Therefore, ships, etc. can navigate safely even near the main wave-absorber body.

Furthermore according to the present invention, a supporting body formed in a triangular column is intercalated inside the top portion of the wave-absorber bodies installed in an inverted-V shape. Thus, the main wave-absorber bodies can be stably installed while floating on the water surface substantially in an inverted-V shape.

Moreover, according to the present invention, a reflected-convection-preventive plates are connected to the main wave-absorber bodies. Thus, where the floating wave absorber according to the present invention is installed in a shoal and other shallow location, waves reflected from the water bottom, etc. that are created by absorbing waves can be attenuated effectively, thus improving a wave-absorbing effect significantly.

What is claimed is:

1. A floating wave absorber, comprising:
   a main wave-absorber body constructed for floating on the surface of water, said main wave-absorber body having a first end portion and a second end portion;
   a first wire having one end connected to said first end portion of said main wave-absorber body and a second wire having one end thereof connected to said second end portion of said main wave-absorber body; said first wire and said second wire each having an opposite end portion;
   a first traction member having one end thereof connected to said opposite end portion of each of said first wire and said second wire; said first traction member having another end thereof fixed to an anchor; and
   a second traction member having one end thereof connected to a bottom one of said first or second end portions of said main wave-absorber body; said second traction member having another end thereof fixed to another anchor.

2. A floating wave absorber, comprising:
   a main wave-absorber body constructed for floating on the surface of water, said main wave-absorber body having a first end portion and a second end portion;
   a first wire having one end connected to said first end portion of said main wave-absorber body and a second wire having one end thereof connected to said second end portion of said main wave-absorber body; said first wire and said second wire each having an opposite end portion;
   a first traction member having one end thereof connected to said opposite end portion of each of said first wire and said second wire; said first traction member having another end thereof fixed to a first anchor; and
   a second traction member having one end thereof connected to a bottom one of said first or second end portions of said main wave-absorber body; said second traction member having another end thereof fixed to a second anchor; and
   a third traction member having one end thereof connected to a top one of said first and second end portions of said main wave-absorber body; said third traction member having another end thereof fixed to a third anchor.

3. A floating wave absorber, comprising:
   a main wave-absorber body constructed for floating on the surface of water; said main wave-absorber body including at least two wave-absorber elements hingedly connected together at adjacent end portions; and
   a plurality of traction members of which one end of each is connected to a free end portion of each of said at least two wave-absorber elements; said traction member having the other end thereof connected to an anchor installed at the bottom of water, wherein:
   said at least two wave-absorber elements are installed floatedly on the surface of water in a substantially inverted-V shape; and
   a supporting body formed in a triangular-column shape is intercalatedly installed inside the tip portion of said main wave absorber body installed in an inverted-V shape.

4. The floating wave absorber of claim 3, wherein a reflected-convection-preventive plate is intercalated between said each main wave-absorber body and the end portion of said traction member connected to the free end portion of said each main wave-absorber body.

5. A floating wave absorber, comprising:
   a main wave-absorber body constructed for floating on the surface of water; said main wave-absorber body including at least two wave-absorber elements hingedly connected together at adjacent end portions; and
   a plurality of traction members of which one end of each is connected to a free end portion of each of said at least two wave-absorber elements, and said traction member having the other end thereof connected to an anchor installed at the bottom of water, wherein:
   said at least two wave-absorber elements are installed floatedly on the surface of water in a substantially inverted-V shape; and
   wherein a reflected-convection-preventive plate is intercalated between each free end portion of said at least two wave-absorber elements and the end portion of said traction member connected to said free end portion of said at least two wave-absorber elements.

* * * * *